(12) United States Patent
Rosenberg et al.

(10) Patent No.: US 9,740,340 B1
(45) Date of Patent: Aug. 22, 2017

(54) VISUALLY CONSISTENT ARRAYS INCLUDING CONDUCTIVE MESH

(75) Inventors: Ilya D. Rosenberg, Mountain View, CA (US); Julien G. Beguin, San Francisco, CA (US); Kenneth H. Perlin, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 926 days.

(21) Appl. No.: 12/846,295

(22) Filed: Jul. 29, 2010

Related U.S. Application Data

(60) Provisional application No. 61/230,592, filed on Jul. 31, 2009.

(51) Int. Cl.
  *G06F 3/045* (2006.01)
  *G06F 3/044* (2006.01)
  *G06F 3/041* (2006.01)

(52) U.S. Cl.
  CPC .............. *G06F 3/044* (2013.01); *G06F 3/045* (2013.01); *G06F 3/0412* (2013.01); *G06F 2203/04108* (2013.01); *G06F 2203/04112* (2013.01)

(58) Field of Classification Search
  CPC . G06F 3/044; G06F 3/045; G06F 2203/04112
  USPC .................................................. 345/173, 174
  See application file for complete search history.

(56) References Cited

U.S. PATENT DOCUMENTS

| | | | |
|---|---|---|---|
| 3,944,740 A | 3/1976 | Murase et al. | |
| 4,526,043 A | 7/1985 | Boie et al. | |
| 4,587,378 A | 5/1986 | Moore | |
| 4,952,031 A | 8/1990 | Tsunoda et al. | |
| 4,983,786 A | 1/1991 | Stevens et al. | |
| 5,105,548 A | 4/1992 | Fowler | |
| 5,543,589 A | 8/1996 | Buchana et al. | |
| 5,597,183 A | 1/1997 | Johnson | |
| 5,666,113 A | 9/1997 | Logan | |
| 5,761,485 A | 6/1998 | Munyan | |

(Continued)

FOREIGN PATENT DOCUMENTS

| | | |
|---|---|---|
| JP | 09282100 | 10/2007 |
| WO | WO2007/141566 A2 | 12/2007 |

(Continued)

OTHER PUBLICATIONS

Moscovich, et al., "Multi-finger Cursor Techniques", Department of Computer Science, Brown University, Year of Publication: 2006, 7 pages.

(Continued)

*Primary Examiner* — Kwang-Su Yang
(74) *Attorney, Agent, or Firm* — Lee & Hayes, PLLC

(57) ABSTRACT

Components such as touch sensors, antennas, and so forth may use arrays of elements to form operational components. Disposition of such an array between the user and a display device, pre-printed image, and so forth may result in moiré patterns or other unpleasant visual distractions. Visually consistent arrays utilize conductive mesh regions which are less visible than larger individual conductors. Non-conductive regions may be formed within an otherwise conductive mesh by introducing breaks in the conductive elements comprising the mesh. Additionally, in some implementations the non-conductive regions provide additional mechanical support.

16 Claims, 8 Drawing Sheets

(56) References Cited

U.S. PATENT DOCUMENTS

| | | | |
|---|---|---|---|
| 5,818,430 A | 10/1998 | Heiser | |
| 5,825,352 A | 10/1998 | Bisset et al. | |
| 5,847,698 A | 12/1998 | Reavey et al. | |
| 6,072,474 A | 6/2000 | Morimura et al. | |
| 6,128,007 A | 10/2000 | Seybold | |
| 6,229,502 B1 | 5/2001 | Schwab | |
| 6,392,636 B1 | 5/2002 | Ferrari et al. | |
| 6,594,606 B2 | 7/2003 | Everitt | |
| 6,762,752 B2 | 7/2004 | Perski et al. | |
| 6,980,202 B2 | 12/2005 | Carro | |
| 6,982,699 B1 | 1/2006 | Lenssen et al. | |
| 7,123,243 B2 | 10/2006 | Kawasaki et al. | |
| 7,166,966 B2 | 1/2007 | Naugler, Jr. et al. | |
| 7,190,348 B2 | 3/2007 | Kennedy et al. | |
| 7,199,322 B2 | 4/2007 | Bourdelais et al. | |
| 7,324,093 B1 | 1/2008 | Gettemy et al. | |
| 7,339,577 B2 | 3/2008 | Sato et al. | |
| 7,619,616 B2 | 11/2009 | Rimas Ribikauskas et al. | |
| 7,760,187 B2 | 7/2010 | Kennedy | |
| 7,800,586 B2 | 9/2010 | Serban et al. | |
| 7,825,905 B2 | 11/2010 | Philipp | |
| 8,089,470 B1 | 1/2012 | Schediwy et al. | |
| 8,223,278 B2 | 7/2012 | Kim et al. | |
| 8,243,424 B1 | 8/2012 | Babu et al. | |
| 8,265,717 B2 | 9/2012 | Gorsica et al. | |
| 8,316,324 B2 | 11/2012 | Boillot | |
| 2001/0013855 A1 | 8/2001 | Fricker et al. | |
| 2002/0015024 A1 | 2/2002 | Westerman et al. | |
| 2002/0080123 A1 | 6/2002 | Kennedy et al. | |
| 2002/0149572 A1* | 10/2002 | Schulz et al. | 345/174 |
| 2002/0180714 A1 | 12/2002 | Duret | |
| 2003/0067449 A1 | 4/2003 | Yoshikawa et al. | |
| 2003/0156098 A1 | 8/2003 | Shaw et al. | |
| 2003/0210235 A1 | 11/2003 | Roberts | |
| 2003/0234768 A1 | 12/2003 | Rekimoto et al. | |
| 2004/0125087 A1 | 7/2004 | Taylor et al. | |
| 2004/0174324 A1 | 9/2004 | Yamazaki et al. | |
| 2005/0083316 A1 | 4/2005 | Brian et al. | |
| 2005/0200798 A1 | 9/2005 | Tanaka | |
| 2005/0259087 A1 | 11/2005 | Hoshino et al. | |
| 2006/0012580 A1 | 1/2006 | Perski et al. | |
| 2006/0028459 A1 | 2/2006 | Underwood et al. | |
| 2006/0050062 A1 | 3/2006 | Ozawa et al. | |
| 2006/0097991 A1 | 5/2006 | Hotelling et al. | |
| 2006/0109252 A1 | 5/2006 | Kolmykov-Zotov et al. | |
| 2006/0192726 A1 | 8/2006 | Huitema et al. | |
| 2006/0198080 A1* | 9/2006 | Hawes et al. | 361/311 |
| 2006/0209045 A1 | 9/2006 | Su et al. | |
| 2006/0244735 A1 | 11/2006 | Wilson | |
| 2006/0293864 A1 | 12/2006 | Soss | |
| 2007/0152976 A1 | 7/2007 | Townsend et al. | |
| 2007/0235231 A1 | 10/2007 | Loomis et al. | |
| 2007/0236618 A1* | 10/2007 | Maag et al. | 349/12 |
| 2008/0018611 A1 | 1/2008 | Serban et al. | |
| 2008/0074400 A1 | 3/2008 | Gettemy et al. | |
| 2008/0143679 A1 | 6/2008 | Harmon et al. | |
| 2008/0158183 A1* | 7/2008 | Hotelling et al. | 345/173 |
| 2008/0160656 A1 | 7/2008 | Chanda et al. | |
| 2008/0168403 A1 | 7/2008 | Westerman et al. | |
| 2008/0180406 A1 | 7/2008 | Han et al. | |
| 2008/0246723 A1* | 10/2008 | Baumbach | 345/156 |
| 2008/0254822 A1 | 10/2008 | Tilley | |
| 2008/0296073 A1 | 12/2008 | McDermid | |
| 2008/0303799 A1 | 12/2008 | Schwesig et al. | |
| 2009/0102805 A1 | 4/2009 | Meijer et al. | |
| 2009/0120696 A1 | 5/2009 | Hayakawa et al. | |
| 2009/0165296 A1* | 7/2009 | Carmi | 29/847 |
| 2009/0174679 A1 | 7/2009 | Westerman | |
| 2009/0218310 A1* | 9/2009 | Zu et al. | 216/11 |
| 2009/0219258 A1 | 9/2009 | Geaghan et al. | |
| 2009/0227295 A1 | 9/2009 | Kim | |
| 2009/0237374 A1 | 9/2009 | Li et al. | |
| 2009/0256817 A1* | 10/2009 | Perlin et al. | 345/174 |
| 2009/0289914 A1 | 11/2009 | Cho | |
| 2010/0005427 A1 | 1/2010 | Zhang et al. | |
| 2010/0013797 A1 | 1/2010 | Kim et al. | |
| 2010/0020043 A1 | 1/2010 | Park et al. | |
| 2010/0090964 A1 | 4/2010 | Soo et al. | |
| 2010/0117974 A1 | 5/2010 | Joguet et al. | |
| 2010/0123670 A1* | 5/2010 | Philipp | 345/173 |
| 2010/0139990 A1 | 6/2010 | Westerman et al. | |
| 2010/0182285 A1 | 7/2010 | Tremblay | |
| 2010/0199221 A1 | 8/2010 | Yeung et al. | |
| 2010/0267421 A1 | 10/2010 | Rofougaran | |
| 2010/0277439 A1 | 11/2010 | Charlier et al. | |
| 2010/0295781 A1 | 11/2010 | Alameh et al. | |
| 2011/0007021 A1 | 1/2011 | Bernstein et al. | |
| 2011/0037709 A1 | 2/2011 | Cottarel et al. | |
| 2011/0061947 A1 | 3/2011 | Krah et al. | |
| 2011/0096033 A1 | 4/2011 | Ko | |
| 2011/0109577 A1 | 5/2011 | Lee et al. | |
| 2011/0242037 A1 | 10/2011 | Gruber | |
| 2011/0254864 A1 | 10/2011 | Tsuchikawa et al. | |
| 2012/0057064 A1 | 3/2012 | Gardiner et al. | |
| 2012/0084691 A1 | 4/2012 | Yun | |
| 2012/0105324 A1 | 5/2012 | Lee et al. | |
| 2012/0313880 A1* | 12/2012 | Geaghan et al. | 345/173 |
| 2012/0320247 A1 | 12/2012 | Kim et al. | |

FOREIGN PATENT DOCUMENTS

| | | |
|---|---|---|
| WO | WO2009/008568 A1 | 1/2009 |
| WO | WO2009/021836 A1 | 2/2009 |

OTHER PUBLICATIONS

Non-Final Office Action for U.S. Appl. No. 13/247,669, mailed on Feb. 1, 2013, Julien G. Beguin et al., "Interacting Through Noncontact Gestures", 22 pages.

Non-Final Office Action for U.S. Appl. No. 12/846,368, mailed on Feb. 15, 2013, Ilya D. Rosenberg et al., "Touch Distinction", 23 pages.

Office Action for U.S. Appl. No. 12/846,539, mailed on Feb. 15, 2013, Ilya D. Rosenberg et al., "Magnetic Touch Discrimination", 20 pages.

Ashbrook, et al., "Nenya: Subtle and Eyes-Free Mobile Input with a Magnetically-Tracked Finger Ring", CHI 2011, May 7-12, 2011, 4 pages.

Harrison, et al., "Abracadabra: Wireless, High-Precision, and Unpowered Finger Input for Very Small Mobile Devices", In Proceedings of the 22nd Annual ACM Symposium on User interface Software and Technology (Victoria, British Columbia, Canada, Oct. 4-7, 2009). UIST '09. ACM, New York, NY, 4 pages.

Non-Final Office Action for U.S. Appl. No. 12/846,497, mailed on Dec. 14, 2012, Ilya D. Rosenberg et al., "Capacitive Sensing with Interpolating Force-Sensitive Resistor Array", 26 pages.

Office action for U.S. Appl. No. 12/846,328, mailed on Dec. 24, 2012, Rosenberg et al., "Two-Sided Touch Sensor", 15 pages.

Final Office Action for U.S. Appl. No. 12/846,539, mailed on Oct. 25, 2013, Ilya D. Rosenberg, "Magnetic Touch Discrimination", 26 pages.

Office Action for U.S. Appl. No. 12/846,268, mailed on Oct. 23, 2013, Ilya D. Rosenberg, "Gestures and Touches on Force-sensitive Input Devices", 37 pages.

Office Action for U.S. Appl. No. 12/846,428, mailed on Oct. 9, 2013, Ilya D. Rosenberg, "Hardware Enabled Interpolating Sensor and Display", 25 pages.

Office action for U.S. Appl. No. 12/846,368, mailed on Sep. 13, 2013,Rosenberg et al., "Touch Distinction", 36 pages.

Wolf, et al., "Angles, Azimuths, and Bearings", Pearson Prentice Hall, Elementary Surveying, 12th Edition, 2008, Chapter 7, pp. 165-184.

Office action for U.S. Appl. No. 12/846,519, mailed on Apr. 24, 2013, Rosenberg et al., "Touch Sensing Techniques", 23 pages.

Office action for U.S. Appl. No. 12/846,497, mailed on Apr. 25, 2013, Rosenberg et al., "Capacitive Sensing with Interpolating Force-Sensitive Resistor Array", 27 pages.

Office action for U.S. Appl. No. 12/846,268, mailed on May 3, 2013, Rosenberg et al., "Gestures and Touches on Force-sensitive Input Devices", 15 pages.

(56) References Cited

OTHER PUBLICATIONS

Office action for U.S. Appl. No. 13/247,699, mailed on Jul. 19, 2013, Beguin et al., "Interacting Through Noncontact Gestures", 32 pages.
Office action for U.S. Appl. No. 12/846,328, mailed on Aug. 15, 2013, Rosenberg et al., "Two-Sided Touch Sensor", 18 pages.
Office action for U.S. Appl. No. 12/846,428, mailed on Feb. 21, 2014, Rosenberg, et al., "Hardware Enabled Interpolating Sensor and Display", 30 pages.
Office Action for U.S. Appl. No. 13/247,699, mailed on Jan. 31, 2014, Julien G. Beguin, "Interacting Through Noncontact Gestures", 28 pages.
Office action for U.S. Appl. No. 12/846,519, mailed on Nov. 14, 2013, Rosenberg, et al., "Touch Sensing Techniques", 24 pages.
Office Action for U.S. Appl. No. 12/846,328, mailed on Dec. 19, 2013, Ilya D. Rosenberg, "Two-Sided Touch Sensor", 13 pages.
Office Action for U.S. Appl. No. 12/846,268, mailed on Jul. 29, 2010, Ilya D. Rosenberg, "Gestures and Touches on Force-sensitive Input Devices", 32 pages.
Office action for U.S. Appl. No. 12/846,368, mailed on Jul. 17, 2014, Rosenberg et al., "Touch Distinction", 45 pages.

\* cited by examiner

VISUALLY CONSISTENT ARRAYS INCLUDING CONDUCTIVE MESH

PRIORITY

The present application claims priority to U.S. Provisional Application Ser. No. 61/230,592, filed on Jul. 31, 2009, entitled "Inventions Related to Touch Screen Technology." This application is hereby incorporated by reference in its entirety, and the benefit of the filing date of this application is claimed to the fullest extent permitted.

BACKGROUND

Electronic devices are ubiquitous, and include cellular phones, eBook readers, tablet computers, desktop computers, portable media devices, and so forth. These electronic devices may utilize touch sensors, antennas, or other components which have elements arranged in a regular or repeating pattern. Traditionally, placement of these components between a display device and a user has resulted in undesirable visual effects. For example, large individual conductors in these components may obscure underlying display elements.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
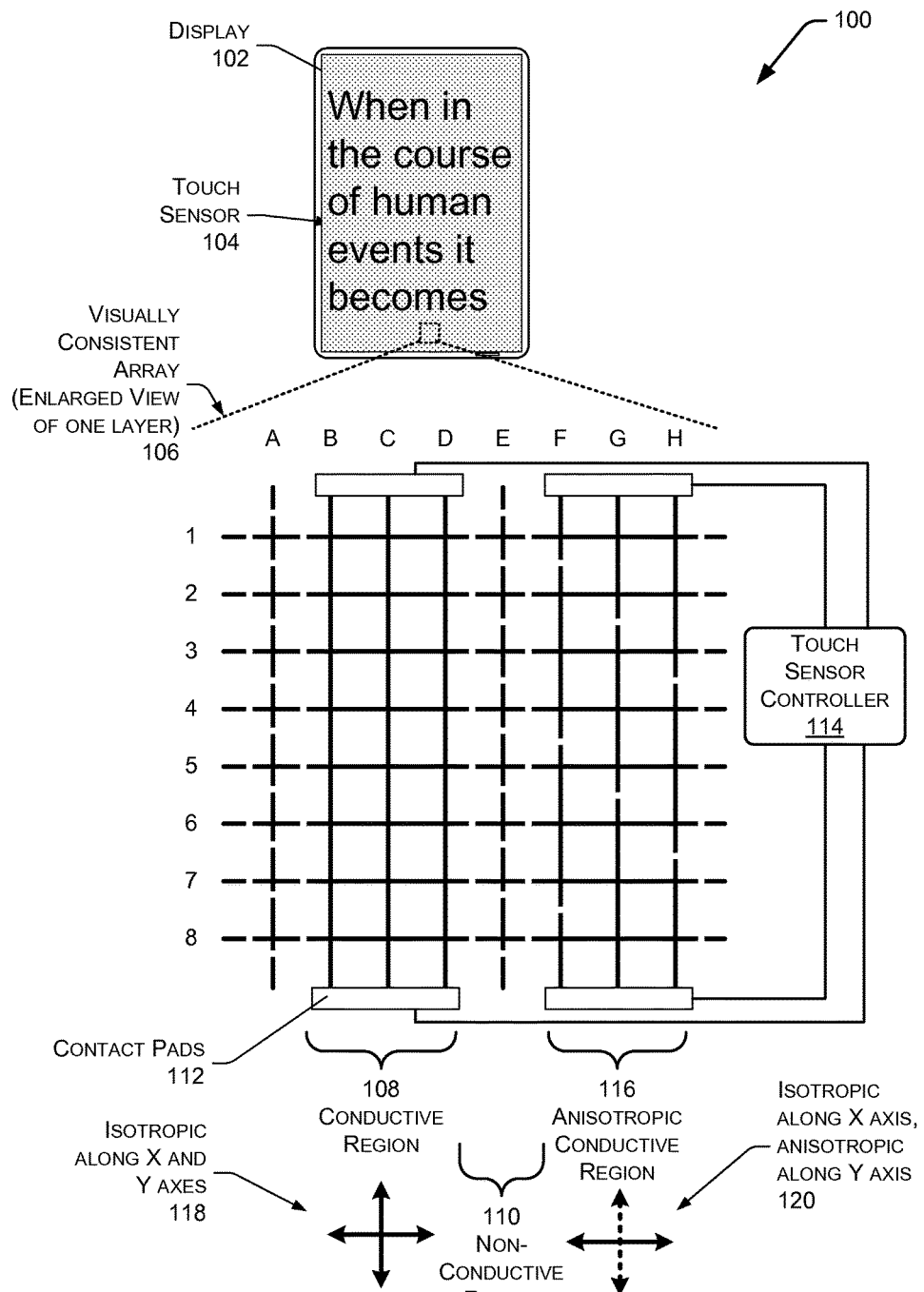
FIG. 1 depicts an electronic device configured with a display and touch sensor, the touch sensor configured with a visually consistent array comprising conductive and non-conductive regions.

Visually consistent arrays for electronic devices are described. Electronic devices may include essentially any device that has a display or which sends/receives signals such as cellular phones, eBook readers, tablet computers, desktop computers, portable media devices, and so forth. Typically, such devices utilize touch sensors, antennas, or other components which may have elements arranged in a regular or repeating pattern or array. Traditionally, placement of these components between a display device and a user may result in undesirable visual effects. For example, consider a touch sensor comprising a grid of electrical conductors. Placement of this touch sensor in front of a pixilated display may result in moiré patterns or other unwanted visual effects such as obscuration by individual large conductors which comprise the grid. These effects are distracting to the user and degrade the overall user experience, potentially reducing the ability of the user to concentrate upon information presented on the display.

Described here are devices and techniques for a visually consistent array. A conductive mesh transfers electrical signals within arrays such as touch sensors, displays, antennas, and so forth, rather than discrete large conductors. This conductive mesh may be configured to provide anisotropic effects, such as presenting a high resistance to current flow along one direction and less resistance to current flow along another. Non-conductive regions are incorporated between conductive mesh region. In addition to isolating the conductive mesh regions, these non-conductive elements "fill-in" the array and present a more consistent visual appearance which can be less distracting to a human eye than when viewing functional or conductive elements alone. Because the individual conductors within the mesh are smaller than a single conductor necessary to carry the current required for operation, they are less visible to the user's eye. The non-conductive regions within the mesh may comprise otherwise conductive materials with a plurality of physical breaks or structural separations therein to render them non-conductive, or non-conductive material.

Non-conductive regions also provide mechanical support. For example, in implementations where the component comprises a touch sensor, the non-conductive regions provide additional mechanical support to minimize dislocation of touch sensor layers and reduce sheer stresses in the touch sensor layers.

Where the non-conductive regions incorporate breaks to render them non-conductive, these breaks may be below a pre-determined length threshold in certain implementations. This pre-determined length threshold accounts for angular resolution of a user's unaided eye at a pre-determined distance and optical effects. For example, the length of a break in a conductor may be such that the break is invisible to the user's unaided eye, but large enough to avoid introduction of unwanted optical or electrical effects such as diffraction or charge tunneling.

Conductive regions may form mesh strips suitable in an addressable array such as a touch sensor, display, and so forth. Use of a mesh strip reduces the size of individual conductors making them less visible to users, while maintaining current carrying capabilities, and also introduces a level of redundancy to ameliorate manufacturing defects, damage due to use, and so forth. With a mesh strip, in the event of a break at a particular location, electrical current may flow via alternative routes within the strip, such that connectivity between the input of the mesh strip and the output of the mesh strip is maintained. Anisotropic characteristics may be introduced by selective modification of the individual conductors.

In some implementations, the arrangement of conductive elements within the component may generate optical effects when combined with other devices such as a display which has a regular and repeating arrangement of elements such as a drive matrix, pixels, and so forth. To mitigate effects such as moiré effect, some implementations position the grid of conductive and non-conductive regions of the touch sensor or other component at an angle relative to elements of another component such as an underlying display.

The visually consistent array may be constructed in several ways. In one approach, conductors are emplaced on a substrate in a mesh and a portion of those conductors are broken to render them non-conductive regions. In another approach, a conductive mesh is emplaced on the substrate while a non-conductive mesh is emplaced on the substrate. In yet another approach, the visually consistent array may comprise the component with a conductive region comprising a mesh on a transparent substrate combined with a second substrate having a corresponding mesh to provide the appearance of a consistent single mesh when the substrates are placed adjacent to one another.

Illustrative Device

FIG. 1 depicts an electronic device 100 configured with a display and a touch sensor with a visually consistent array. A display 102 is configured to present information to a user. The display is discussed in more depth below with regards to FIG. 2. For convenience only, the display 102 is shown in a generally rectangular configuration. However, it is understood that the display 102 may be implemented in any shape, and may have any ratio of height to width. Also, for stylistic or design purposes, the display 102 may be curved or otherwise non-linearly shaped. Furthermore the display 102 may be flexible and configured to fold or roll.

A touch sensor 104 accepts input from the user. In some implementations, such as shown here, the display 102 and the touch sensor 104 may be combined to provide a touch-sensitive display, or touchscreen display. In such an arrangement, the display 102 component may be disposed behind the touch sensor 104 component, or vice versa. For the purposes of illustration and not by way of limitation, the display 102 is assumed to be positioned behind the touch sensor 104, which is configured to be transparent or translucent to allow viewing of the display 102.

The touch sensor 104 may be configured with a visually consistent array 106 which is shown in an enlarged view of one layer is shown in this figure. The layer of the visually consistent array 106 depicted here uses a mesh with a rectangular grid. In other implementations, the mesh may comprise other regular or irregular but interconnected patterns. For illustrative purposes, and not by way of limitation, rows within the mesh are designated with numbers 1-8 and columns within the mesh are designated with the letters A-H. In other implementations, the array may comprise serpentine arrays, polygonal arrays, and so forth. Furthermore, the mesh may comprise a plurality of discrete conductors, a perforated conductor, and so forth. While shown in the context of touch sensors for displays, it is noted that the visually consistent array 106 may be used in a variety of components including antenna arrays, multiple layer displays, and so forth.

As shown here, a conductive region 108 forms a conductive column and a non-conductive region 110 separates conductive regions 108. The conductive regions 108 carry electrical current from an input to an output. In this illustration, conductors are designated with solid lines while non-conductors are designated with broken lines. The non-conductive regions 110 may contain conductive subsections, but are configured to not carry electrical current from the input to the output, such as between contact pads 112 located at the ends of each column. As described, this may be due to the non-conductive regions 110 comprising conductive material which has had a plurality of breaks introduced to interrupt current flow, or the non-conductive regions 110 may comprise a non-conductive or insulative material.

Looking at the single layer depicted in FIG. 1, current will flow from a first contact pad 112 to a second contact pad 112 along the conductive region 108, such as that comprising columns B, C, and D. In contrast, current will not flow between the conductive region 108 comprising columns B, C, and D and the conductive region 108 comprising columns F, G, and H because the non-conductive region 110 resides between them. Thus, the mesh provides an anisotropic current path along the columns. The contact pads 112 may be disposed at the ends of a conductive region 108, and tie together the individual conductive elements or area of the conductive region 108 for coupling to a single conductor.

The layer containing the conductive regions 108 in columns may be placed adjacent to another layer containing a second set of conductive regions 108 disposed in rows to provide an addressable configuration. For example, where the visually consistent array 106 is a part of an interpolating force-sensitive resistor (IFSR) sensor array, two mesh layers having conductive regions 108 perpendicular to one another may be combined to form the visually consistent array 106 which is then scanned by a touch sensor controller 114 to determine resistance at various junctions. The touch sensor controller 114 is described below with regards to FIG. 2 in more detail.

As described above, the conductive region 108 may be considered to act isotropicly along the rows and columns (or X and Y axes, respectively). That is, for a given length of conductive region, resistance is substantially the same when measured from top-to-bottom or side-to-side. However, it may be advantageous to use anisotropic regions in some devices, such as IFSR touch sensors.

Conductive regions may be modified to have anisotropic characteristics. In one example shown here, an anisotropic conductive region 116 is formed by introducing breaks selectively into an otherwise conductive region. In this example, a small numbers of breaks have been introduced into columns F, G and H, while the rows within the region remain intact. These selective breaks in the columns increase resistance along the Y axis. As a result, current within the anisotropic conductive region 116 flows more easily (that is, with less resistance) for a given length horizontally than vertically 120.

The degree and disposition of breaks or other non-conductive or less-conductive sections within the anisotropic conductive region 118 may be varied to suit the needs of the particular device. For example, to increase the resistance along the Y axis, additional breaks may be made to the columns. It is also possible to have provide anisotropy along multiple directions. For example, in addition to the breaks within the columns, selective breaks may also be added to some rows.

These anisotropic conductive regions 116 allow sensors such as an IFSR sensor to exhibit a linear response with respect to changes in position of a touch relative to the sensor grid. In another example, an antenna may be constructed which takes advantage of these areas of varying resistance to form elements.

The non-conductive regions may be physically broken to render them non-conductive. This breaking may be the result of induced mechanical strain, cleavage, and so forth which separates the otherwise conductive material such that no conductive path remains. In other implementations the non-conductive regions may comprise non-conductive materials. In some implementations, the non-conductive materials may be selected to have similar optical and/or mechanical properties compared to the conductive elements. For example, where the conductors are darker in color, a substantially matching dark non-conductor may be utilized to retain visual consistency.

Non-conductive regions also provide mechanical support. For example, when the component comprises a touch sensor, the non-conductive regions may provide additional mechanical support to minimize shearing stresses resulting from user touches which may failure in one or more layers of the touch sensor. Additionally the non-conductive regions may direct and limit the transmission of force within layers of the touch sensor.

Figure 2:
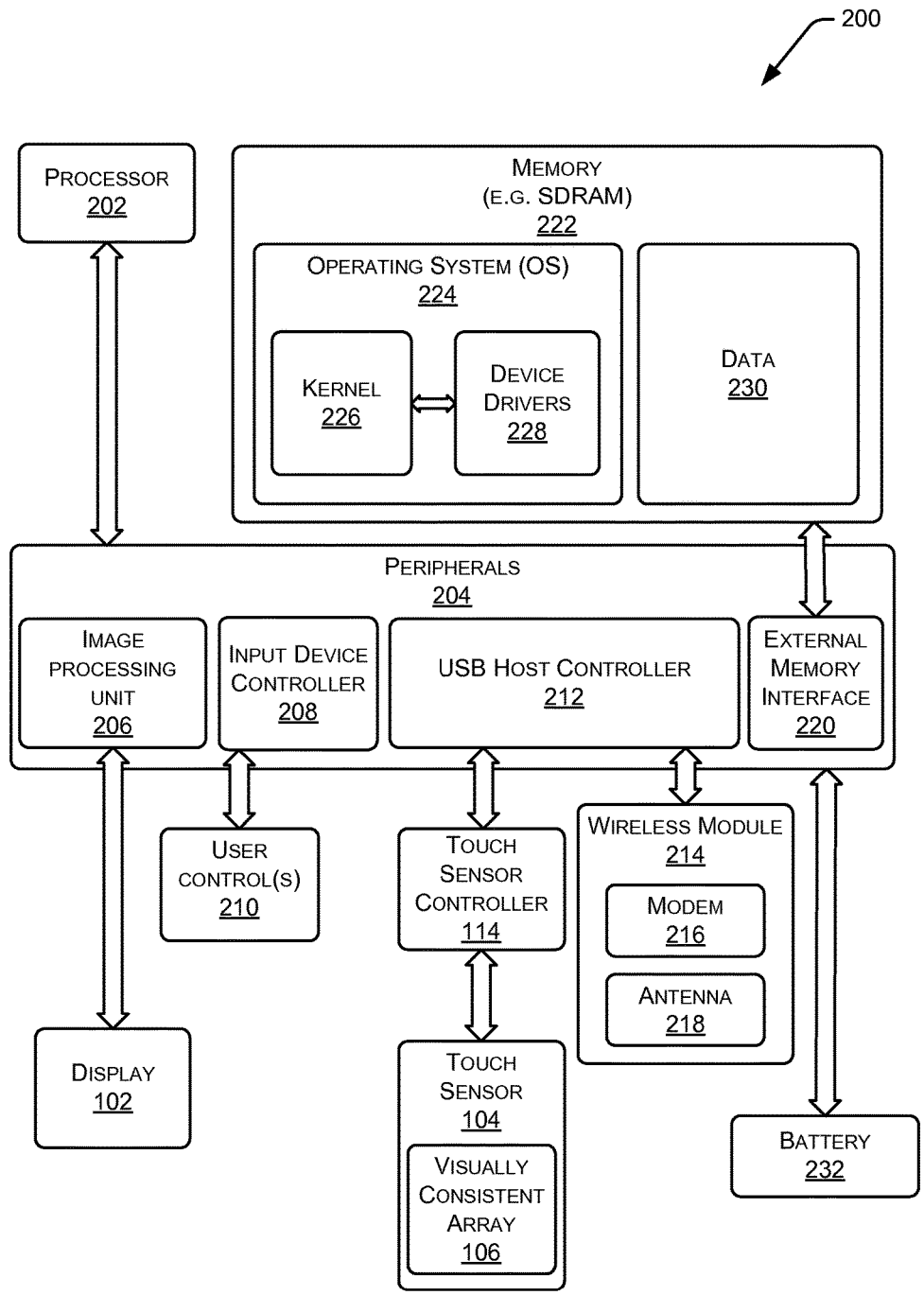
FIG. 2 is an illustrative schematic of the electronic device with visually consistent array.

FIG. 2 is an illustrative schematic 200 of the electronic device 100 of FIG. 1. In a very basic configuration, the device 100 includes components such as a processor 202 and one or more peripherals 204 coupled to the processor 202. Each processor 202 may itself comprise one or more processors.

An image processing unit 206 is shown coupled to one or more display components 102 (or "displays"). In some implementations, multiple displays may be present and coupled to the image processing unit 206. These multiple displays may be located in the same or different enclosures or panels. Furthermore, one or more image processing units 206 may couple to the multiple displays.

The display 102 may present content in a human-readable format to a user. The display 102 may be reflective, emissive, or a combination of both. Reflective displays utilize incident light and include electrophoretic displays, interferometric modulator displays, cholesteric displays, pre-printed materials, and so forth. Emissive displays do not rely on incident light and, instead, emit light. Emissive displays include backlit liquid crystal displays, time multiplexed optical shutter displays, light emitting diode displays, backlit pre-printed materials, and so forth. When multiple displays are present, these displays may be of the same or different types. For example, one display may be an electrophoretic display while another may be a liquid crystal display.

The content presented on the display 102 may take the form of electronic books or "eBooks." For example, the display 102 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The device 100 may have an input device controller 208 configured to accept input from a keypad, keyboard, or other user actuable controls 210. These user actuable controls 210 may have dedicated or assignable operations. For instance, the actuatable controls may include page turning buttons, a navigational keys, a power on/off button, selection keys, joystick, touchpad, and so on.

The device 100 may also include a USB host controller 212. The USB host controller 212 manages communications between devices attached to a universal serial bus ("USB") and the processor 202 and other peripherals.

FIG. 2 further illustrates that the device 100 includes the touch sensor controller 114. The touch sensor controller 114 couples to the processor 202 via the USB host controller 212 (as shown). In other implementations, the touch sensor controller 114 may couple to the processor via the input device controller 208, inter-integrated circuit ("I²C'"), universal asynchronous receiver/transmitter ("UART"), or serial peripheral interface bus ("SPI"), or other interfaces. The touch sensor controller 114 couples to the touch sensor 102. In some implementations multiple touch sensors 104 may be present.

The touch sensor 104 may comprise various technologies including interpolating force-sensing resistance (IFSR) sensors, capacitive, magnetic, force sensitive resistors, acoustic, optical, and so forth. The touch sensor 104 may be configured such that user input through contact or gesturing relative to the device 100 may be received.

The touch sensor controller 114 is configured to determine characteristics of interaction with the touch sensor. These characteristics may include the location of the touch on the touch sensor, magnitude of the force, shape of the touch, and so forth.

The USB host controller 212 may also couple to a wireless module 214 via the universal serial bus. The wireless module 214 may allow for connection to wireless local or wireless wide area networks ("WWAN"). Wireless module 214 may include a modem 216 configured to send and receive data wirelessly and one or more antennas 218 suitable for propagating a wireless signal. In other implementations, the device 100 may include a wired network interface.

The device 100 may also include an external memory interface ("EMI") 220 coupled to external memory 222. The EMI 220 manages access to data stored in external memory 222. The external memory 222 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), Phase-Change RAM ("PCRAM"), or other computer-readable storage media.

The external memory 222 may store an operating system 224 comprising a kernel 226 operatively coupled to one or more device drivers 228. The device drivers 228 are also operatively coupled to peripherals 204, such as the touch sensor controller 114. The external memory 222 may also store data 230, which may comprise content objects for consumption on eBook reader device 100, executable programs, databases, user settings, configuration files, device status, and so forth.

One or more batteries 232 provide operational electrical power to components of the device 100 for operation when the device is disconnected from an external power supply. The device 100 may also include one or more other, non-illustrated peripherals, such as a hard drive using magnetic, optical, or solid state storage to store information, a firewire bus, a Bluetooth™ wireless network interface, camera, global positioning system, PC Card component, and so forth.

Couplings, such as that between the touch sensor controller 114 and the USB host controller 212, are shown for emphasis. There are couplings between many of the components illustrated in FIG. 2, but graphical arrows are omitted for clarity of illustration.

Illustration of Visually Consistent Array

Figure 3:
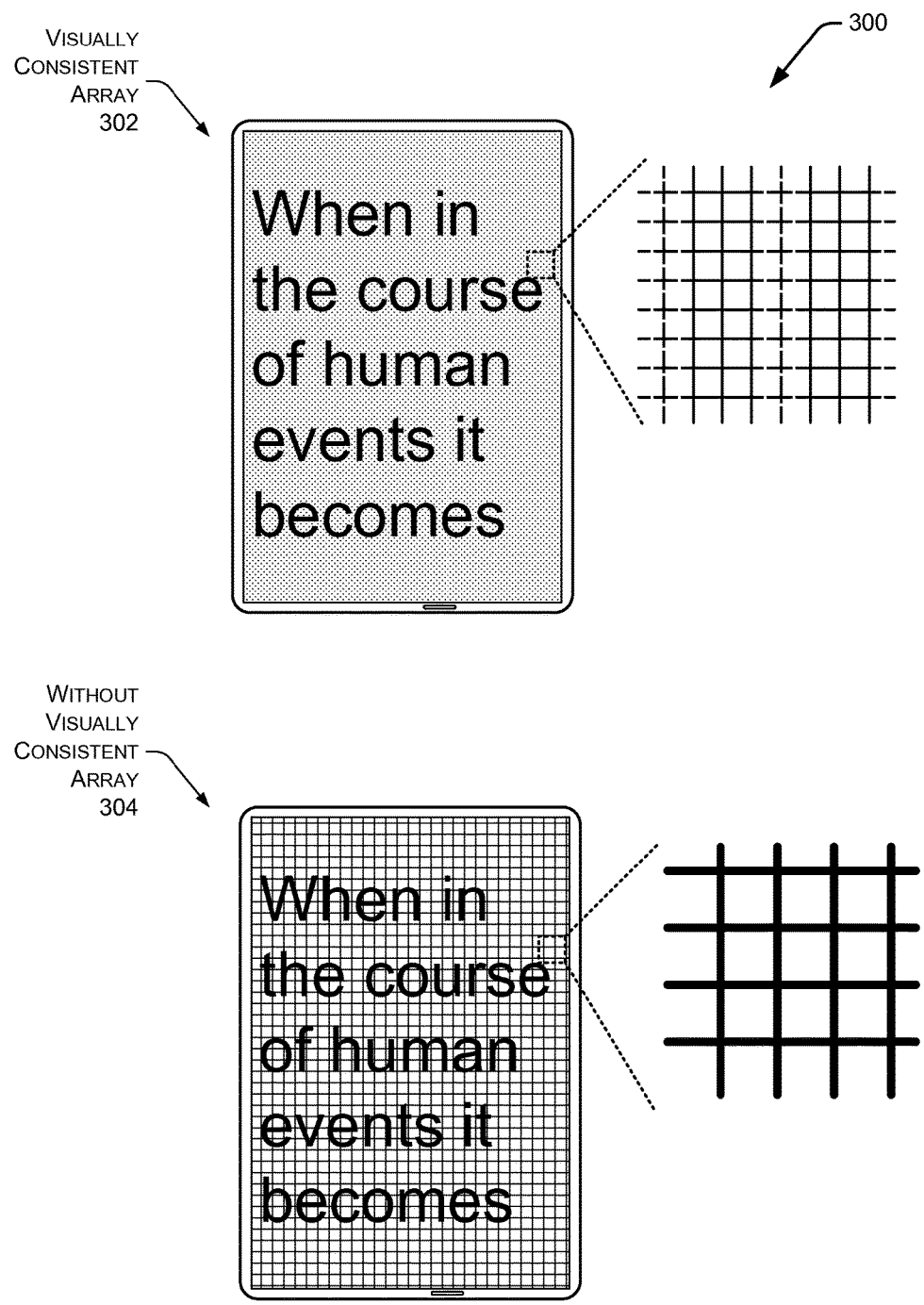
FIG. 3 illustrates the electronic device with the visually consistent array and without the visually consistent array, as may be viewed by a user.

FIG. 3 is an illustration 300 of the electronic device with the visually consistent array 302 and without the visually consistent array 304, as may be viewed by a user. Assume the visually consistent array 106 comprises a portion of the touch sensor 104 which is disposed in front of the display 102. As shown at 302, the conductive regions 108 provided by the mesh are relatively low profile and in combination with the non-conductive regions within the touch sensor blend to form a visually unobtrusive uniform background. The unaided eye of user may perceive the visually uniform background as a slight shading.

In contrast, when individual conductors rather than the conductive regions 108, the larger individual conductors necessary to carry the required current are more apparent to the user. As a result, as shown at 304 a more granular or "screendoor" effect of the touch sensor array is visible, which interferes with the readability of text presented on the display 102. This "screendoor" effect is distracting to the user, and undesirable.

Figure 4:
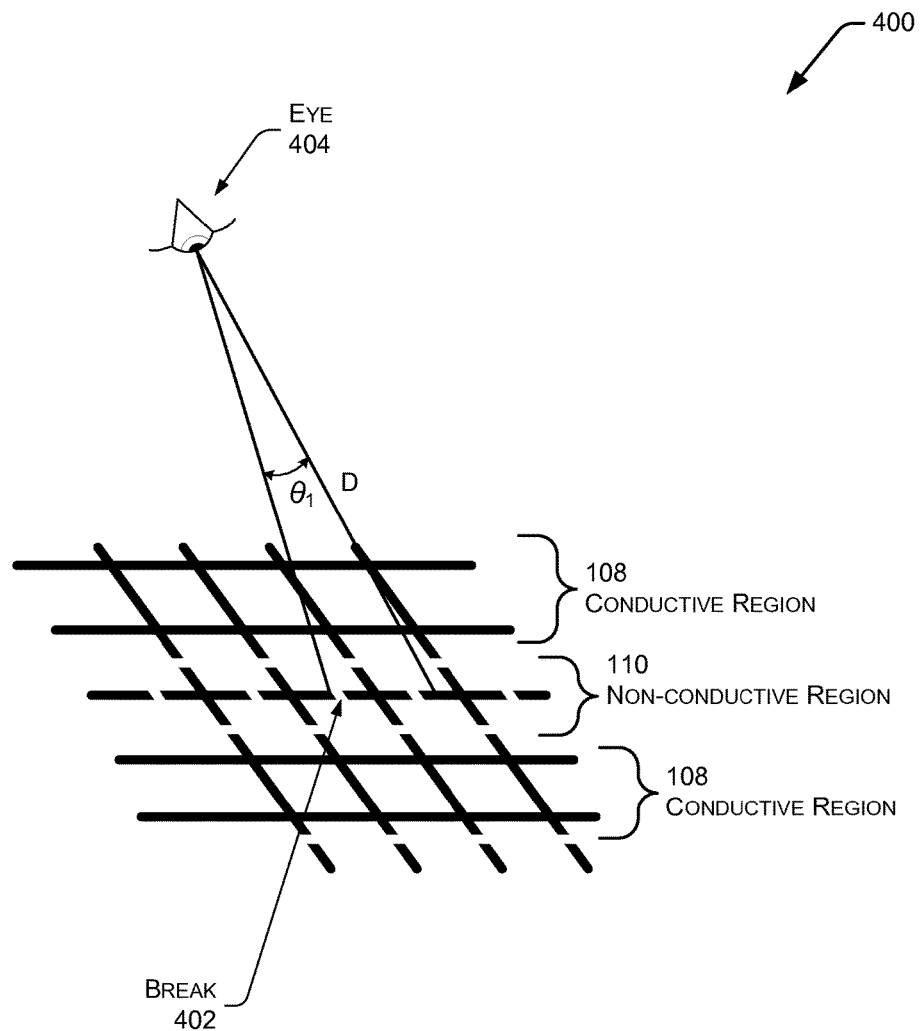
FIG. 4 illustrates an enlarged portion of the visually consistent array depicting breaks within non-conductive regions that are invisible to a user's unaided eye.

FIG. 4 illustrates an enlarged portion 400 of the visually consistent array depicting breaks within non-conductive regions that are invisible to a user's unaided eye. Shown here are two conductive regions 108 interleaved with non-conductive regions 110. These non-conductive regions 110 are composed of conductive material which are broken or otherwise spatially separated. The breaks or separations 402 are invisible to a user's eye 404. Furthermore, the individual conductors within the conductive region 108 are either invisible or minimally visible, particularly when compared to a single larger conductor configured to carry a comparable amount of electrical current.

The user's eye 404 has a minimum perceptible angular resolution extending along distance D towards the break 402 in the non-conductive region 110. Where the minimum perceptible angular resolution $\theta_1$ is greater than a length of the break 402 at the distance D, the user is unable to perceive the break. In other words, the feature size of the break is too small for the user to perceive unaided at distance D. For example, in some implementations breaks with a length of 0.75 millimeters or less may be imperceptible to the user's eye 404 at a distance of 60 centimeters or more. Breaks 402 may, but need not be, of the same length. For example, due to process variations, in some cases one break may be 0.10 mm, while the next break in the same element may be 0.05 mm, another 0.15 mm, and so forth.

The layer of the visually consistent array 106 described herein exploits the inability of the user's eye 402 to perceive small features to minimize the impact of the conductive regions 108 and to render the breaks in the non-conductive regions 110 invisible. For example, during fabrication conductors may be deposited in meshes. After deposition, a portion of the mesh may have a plurality of breaks introduced to render the region non-conductive, thus forming non-conductive regions 110 and leaving conductive regions 108. Breaks may be introduced into otherwise conductive regions by selective deposition, etching, laser cutting, ultrasonic cutting, mechanical fractionation, irradiation and so forth.

Mesh Arrangement

Figure 5:
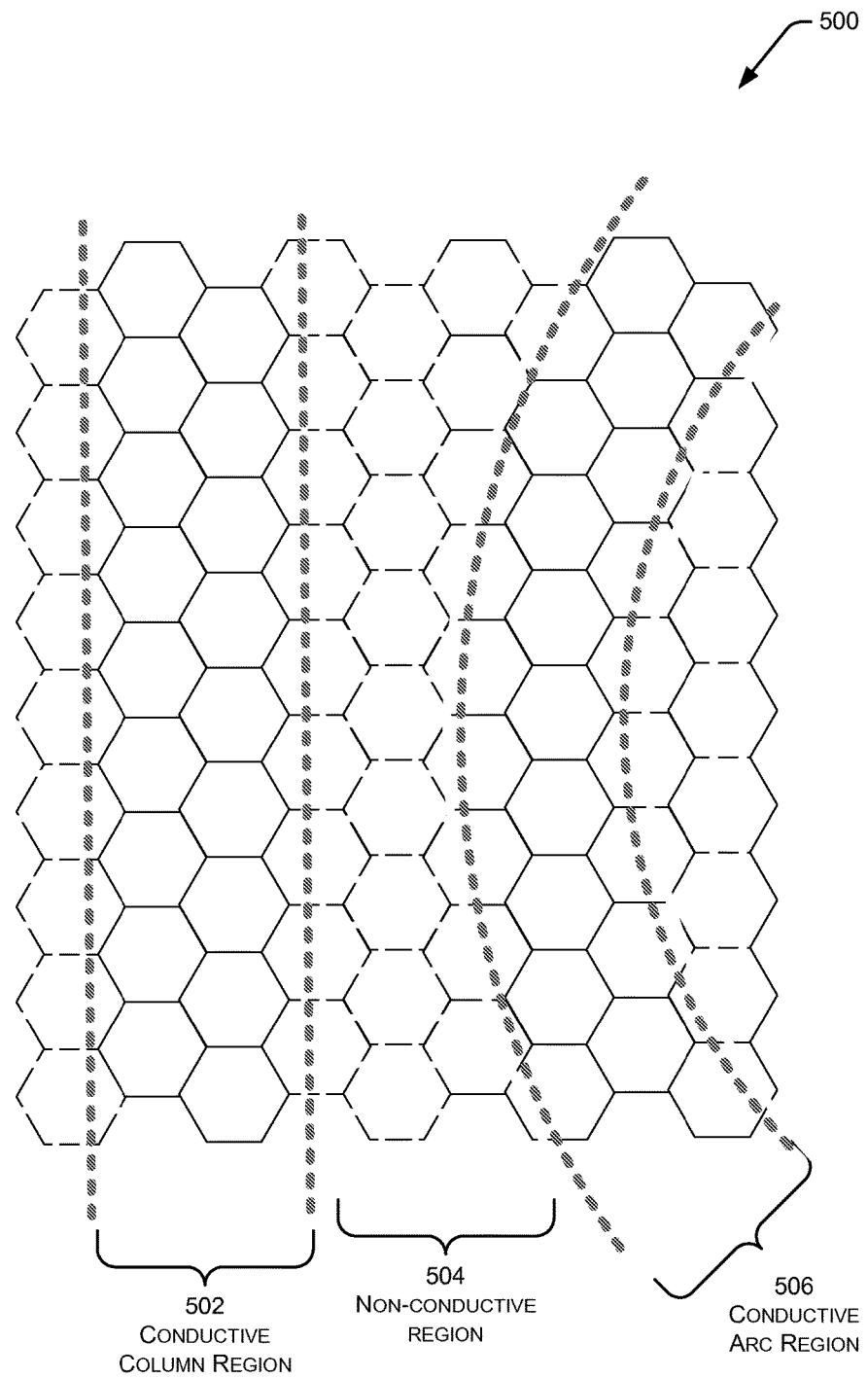
FIG. 5 illustrates an alternate configuration of elements of the visually consistent array comprising a hexagonal mesh arrangement.

FIG. 5 illustrates an alternate configuration 500 of the visually consistent array comprising a hexagonal mesh arrangement. As described above, mesh strips rather than individual conductors are used as elements of the component, such as a touch sensor 104. Use of a mesh strip rather than an individual conductor reduces the size of the conductor necessary by distributing electrical current across multiple smaller conductive pathways and also introduces a level of redundancy which ameliorates manufacturing defects, damage due to use, and so forth. With a mesh strip, in the event of a break at a particular location, electrical current may flow via alternative conductors within the strip, such that connectivity between the input of the mesh strip and the output of the mesh strip is maintained.

As shown at 500, a conductive column region 502 (outlined for clarity with heavy broken lines) may comprise a plurality of hexagonal conductive elements which are cross-linked to one another. Furthermore, as described above a region may be modified to have anisotropic resistance characteristics, such as described above with regards to FIG. 1. For example, selective breaks may be introduced into some or all of the hexagonal conductive elements which are generally parallel to the Y axis. As a result, current would flow with less resistance within the region 502 along the X axis as compared to along the Y axis. In contrast, a non-conductive region 504 comprises breaks within the conductive elements rendering the region non-conductive overall.

Conductive regions 108 may be arranged in various shapes as called for by a particular application. For example, as depicted here, a conductive arc region 506 (outlined for clarity with heavy broken lines) provides a curved conductive pathway between an input and an output.

This mesh arrangement allows reduces the size of individual conductive elements thus rendering them less obtrusive, and also improves redundancy in the event of an undesired break which would impair the operation of a single conductor. For example, a break within one of the hexagonal cells of the conductive column region 502 would not render the conductive column region 502 inactive, as current could flow around the break via adjacent wires within the mesh.

While the mesh has been shown herein with rectangular and hexagonal arrangements, in other implementations other arrangements may be used. For example, a pierced or etched conductive surface, polygonal array such as a triangular array, and so forth. Furthermore, it is worth noting that the mesh need not be regular in arrangement, so long as a plurality of simultaneous conductive pathways are possible within the material above a pre-determined physical threshold. For example, a mat of randomly oriented conductive fibers interspersed with non-conductive fibers may be used in some applications.

Rotation to Minimize Moiré Effect

Figure 6:
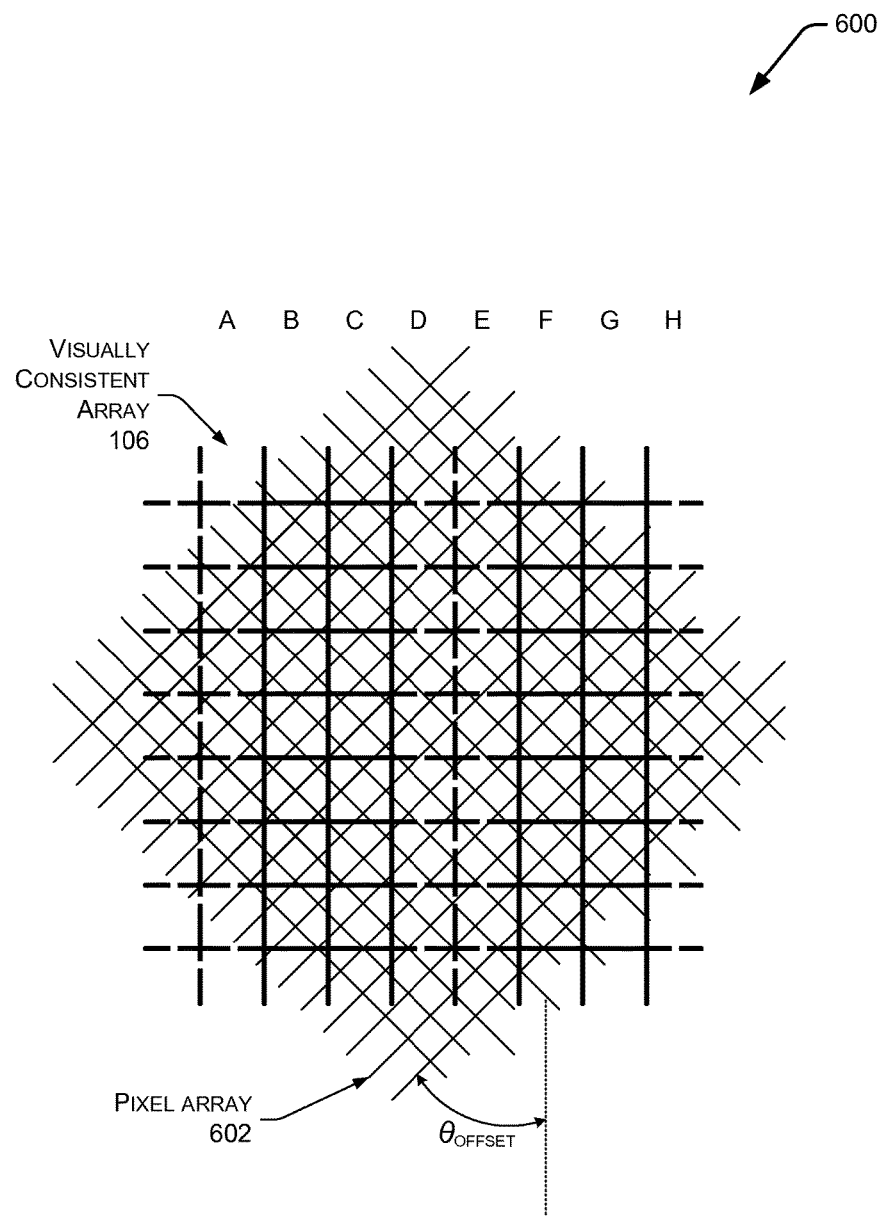
FIG. 6 illustrates a configuration of the visually consistent array with the display such that an angle greater than zero is described between an axis of the visually consistent array and an axis of pixel rows or columns within the display.

FIG. 6 illustrates a configuration 600 of the visually consistent array with the display such that an angle greater than zero is described between an axis of the visually consistent array and an axis of pixel rows or columns within the display. In implementations where the component such as the touch sensor 104 is placed between the user and the display 102, moiré effects may be experienced. These moiré effects result from interaction between the patterns of the visually consistent array 106 and a pattern resulting from a pixel array 602. These moiré effects may be disturbing or distracting to the user.

To mitigate effects such as the undesired moiré effect, in some implementations the visually consistent array 106 may placed at an angle $\theta_{OFFSET}$ relative to elements of another component such as the pixel array 602 of an underlying display 102. As shown in this illustration, the visually consistent array 106 is shown with an $\theta_{OFFSET}$ of about 45 degrees. However, other non-zero angles may be used. As a result of this angular offset, the moiré effect is less pronounced or absent, resulting in a more readable and pleasant appearing display. In another implementation, the visually consistent array may comprise a different pattern, such as the hexagonal pattern depicted within FIG. 5 which reduces or eliminates moiré effects.

Illustrative Processes to Create Visually Consistent Arrays

Figure 7:
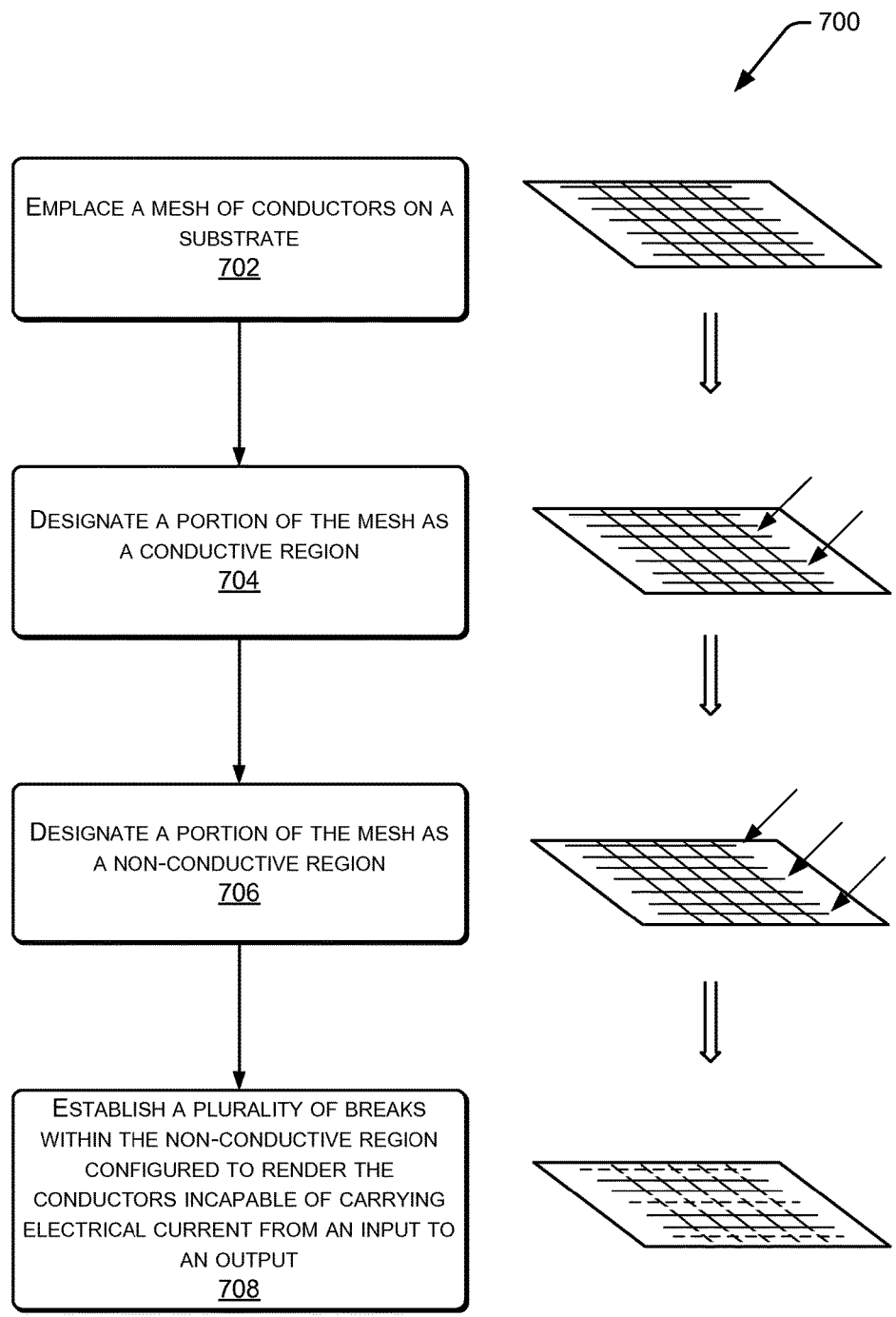
FIG. 7 is an illustrative process of establishing a visually consistent array.

FIG. 7 is an illustrative process 700 of establishing a visually consistent array. This process, and others described in this disclosure may be implemented by the architectures described in this disclosure, or by other architectures. These processes described in this disclosure are illustrated as a collection of blocks in a logical flow graph, which represent a sequence of operations that can be implemented in hardware, software, or a combination thereof. In the context of software, the blocks represent computer-executable instructions that may be stored on one or more computer-readable storage media and that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

At 702, a mesh of conductors is emplaced on a substrate. Emplacement may involve deposition, printing, diffusion, and so forth. The mesh of conductors may comprise portions of a touch sensor, antenna, display, and so forth. The mesh of conductors may be regularly or randomly ordered and provides a plurality of discrete current paths from an input region to an output region.

At 704, a portion of the mesh is designated as a conductive region 108. The conductive region 108 will conduct electrical current from an input region such as the contact pad 112 to an output region such as another contact pad 112 during normal operation of the component. This designation may include physical marking or a determination by processing equipment.

At 706, a portion of the mesh is designated as a non-conductive region. This designation may be made according to a desired distribution of one or more conductive regions. Generally, the conductive regions 108 and the non-conductive regions 110 are disposed in an alternating arrangement, such as depicted in FIGS. 1 and 5, thus forming strips or regions of conductive mesh.

In another implementation, the non-conductive regions 110 fill other areas. For example, consider the display 102 is positioned in behind the touch sensor 104, but due to design considerations the top two-thirds of the display will be used for display and not for touch input, while the bottom third of the display will be used for touch input and display. The bottom third of the display may comprise conductive regions 108 interspersed with non-conductive regions 110 to create the functional touch sensor, while non-conductive regions 110 may be placed within the top two-thirds to maintain visual consistency.

At 708, a plurality of breaks is established within the designated non-conductive regions. These breaks render the drone lines incapable of carrying electrical current from an input to an output. As described above with regards to FIG. 4, these breaks are configured to be invisible or minimally visible to the unaided eye of the user during use, thus below the angular resolution $\theta_1$ of the user's unaided eye at the given distance D. For example, breaks with a length of less than 0.75 mm may be invisible to the user's eye during normal use. These breaks, which individually are below a pre-determined length selected to render them invisible, may be introduced by selective deposition of material, etching, laser cutting, ultrasonic cutting, mechanical fractionation, irradiation, and so forth.

Figure 8:
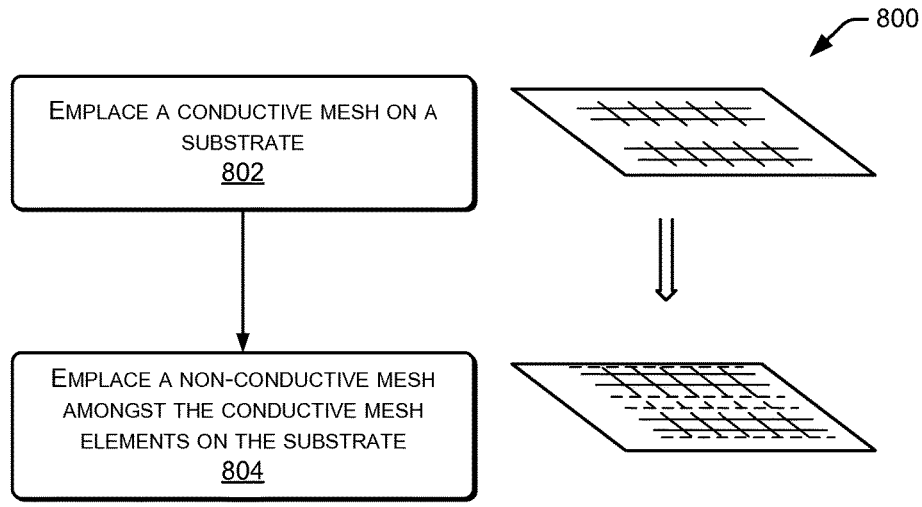
FIG. 8 is an illustrative alternative process of establishing a visually consistent array.

FIG. 8 is an illustrative alternative process 800 of establishing a visually consistent array. In contrast to the process of FIG. 7 which places and breaks elements to form non-conductive regions, here non-conductive materials are emplaced.

At 802 a conductive mesh is emplaced on a substrate. At 804, a non-conductive mesh is emplaced on the substrate amongst the conductive mesh. For example, non-conductive mesh may be interleaved between the conductive mesh. In some implementations where the visually consistent array 106 is present between the display 102 and the user, the substrate may comprise a transparent or translucent material.

Figure 9:
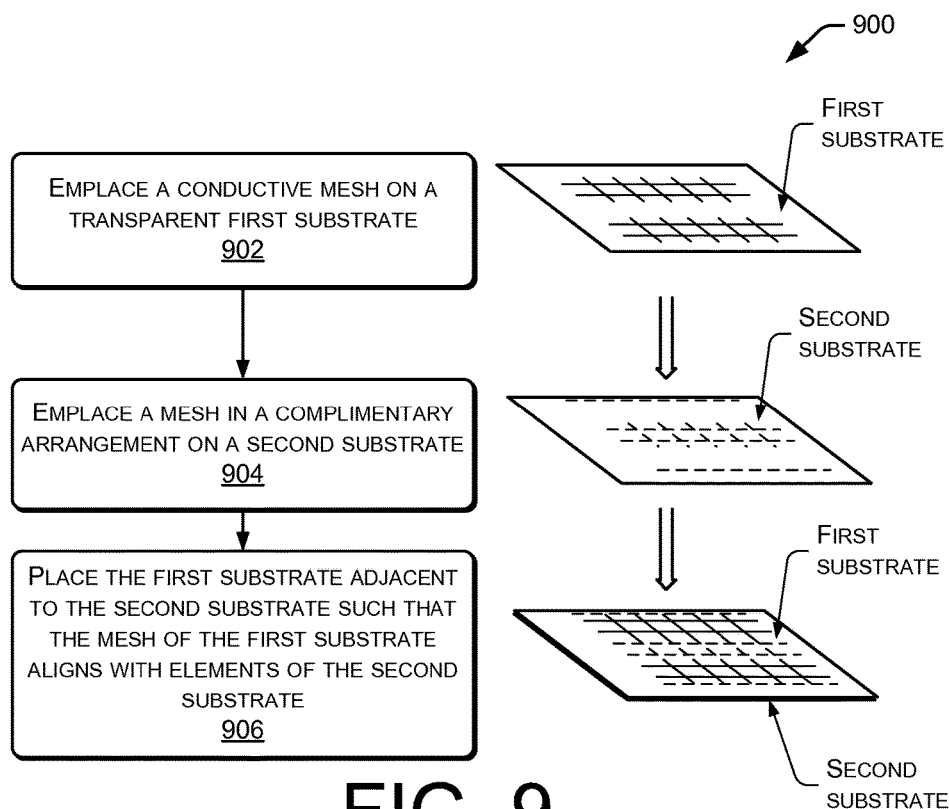
FIG. 9 is another illustrative process of establishing a visually consistent array.

FIG. 9 is an another illustrative process 900 of establishing a visually consistent array. In this process, the component comprising conductive regions is joined to a second substrate which comprises the non-conductive regions.

At 902, a conductive mesh is emplaced on a first substrate. At 904, a second mesh, which may or may not be conductive, is emplaced on a second insulating substrate, such as non-doped silica glass. The second mesh may have the same composition and emplacement methodology as the conductive mesh, but is left unconnected. Because the conductive mesh and the non-conductive mesh are separated by an insulating substrate, there is no requirement to make the second mesh non-conductive. Thus, the same material and manufacturing process may be used to generate both the conductive and the non-conductive meshes.

At 906, the first substrate is placed adjacent to the second substrate, such that the non-conductive mesh appears to be disposed between the conductive mesh.

In another implementation, the conductive mesh may be disposed on a first side of the substrate and the non-conductive mesh emplaced on a second side of the substrate. This reduces parts count, thickness, and may minimize production and assembly costs. The first substrate, the second substrate, or both may be transparent, allowing the user to see both meshes and an apparently consistent background.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A method comprising:
   emplacing a conductive mesh on a substrate;
   designating at least one portion of the conductive mesh as a non-conductive region after emplacing the conductive mesh; and
   establishing a plurality of breaks within the at least one portion of the conductive mesh, the plurality of breaks configured to render the at least one portion of the conductive mesh incapable of carrying electrical current from an input to an output.

2. The method of claim 1, further comprising establishing an anisotropic region by selectively breaking a portion of the conductive mesh.

3. The method of claim 1, further comprising an unbroken portion of the conductive mesh configured to carry electrical current from an input to an output.

4. The method of claim 3, wherein the unbroken portion and the non-conductive region are disposed in an alternating arrangement to form a plurality of mesh electrodes.

5. The method of claim 1, wherein the breaks are configured such that each break is less than about 0.75 millimeters in length.

6. The method of claim 1, wherein the conductive mesh comprises a polygonal mesh.

7. The method of claim 1, wherein the conductive mesh comprises a mat of randomly oriented conductive fibers.

8. The method of claim 1, further comprising placing the conductive mesh in front of a display device.

9. The method of claim 8, wherein the display device comprises an electrophoretic display, a light emitting diode display, or a pre-printed image.

10. The method of claim 8, wherein the conductive mesh comprises a regular array of conductors, and further comprising placing the regular array of conductors such that an angle greater than zero is described between an axis of the regular array of conductors and an axis of pixel rows or columns within the display device.

11. A method comprising:
   emplacing a plurality of conductive mesh elements on a first side of a substrate;
   designating at least one portion of the plurality of conductive mesh elements as non-conductive regions; and
   establishing, after emplacing the plurality of conductive mesh elements, the non-conductive regions within the plurality of conductive mesh elements by establishing a plurality of breaks within one or more portions of the plurality of conductive mesh elements, the plurality of breaks configured to render the portions incapable of carrying electrical current from an input to an output.

12. The method of claim 11, wherein the conductive mesh elements comprise a portion of a touch sensor, an antenna, or a display.

13. The method of claim 11, wherein the plurality of conductive mesh elements form at least a part of an interpolating force-sensing resistance (IFSR) sensor array that detects a measurement of force applied to a touch sensor.

14. The method of claim 11, wherein the substrate is substantially transparent or translucent and further comprising a display disposed behind a touch sensor and configured to present an image through at least a portion of the touch sensor.

15. The method of claim 11, wherein the breaks are configured such that each break is less than about 0.75 millimeters in length.

16. The method of claim 11, wherein the plurality of conductive mesh elements comprises a polygonal mesh.

* * * * *